(12) United States Patent
von Brandt

(10) Patent No.: US 6,424,633 B1
(45) Date of Patent: Jul. 23, 2002

(54) RADIO RELAY ARRANGEMENT FOR EXTENDING THE RANGE ON THE RADIO LINK OF A TELECOMMUNICATION SYSTEM

(75) Inventor: Achim von Brandt, München (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/125,105

(22) PCT Filed: Feb. 7, 1997

(86) PCT No.: PCT/EP97/00562

§ 371 (c)(1),
(2), (4) Date: Aug. 6, 1998

(87) PCT Pub. No.: WO97/29561

PCT Pub. Date: Aug. 14, 1997

(30) Foreign Application Priority Data

Feb. 9, 1996 (DE) .......................................... 96 101 911

(51) Int. Cl.⁷ .................................................. H04J 3/08
(52) U.S. Cl. ...................................... 370/280; 370/328
(58) Field of Search .............................. 370/276, 277, 370/280, 337, 347, 328

(56) References Cited

U.S. PATENT DOCUMENTS

| | | | | |
|---|---|---|---|---|
| 5,550,992 A | * | 8/1996 | Hashimoto | 375/355 |
| 5,959,980 A | * | 9/1999 | Scott | 370/280 |
| 6,032,033 A | * | 2/2000 | Morris et al. | 455/277.2 |
| 6,094,421 A | * | 7/2000 | Scott | 370/280 |

FOREIGN PATENT DOCUMENTS

| | | | | |
|---|---|---|---|---|
| EP | 0 614 290 A1 | 7/1994 | | H04B/7/26 |
| EP | 0 637 144 A1 | 1/1995 | | H04B/7/26 |
| EP | 0 670 640 | 6/1995 | | H04B/7/26 |
| WO | WO 95/26615 | 5/1995 | | |

\* cited by examiner

Primary Examiner—Chau Nguyen
Assistant Examiner—Duc Duong
(74) Attorney, Agent, or Firm—Staas & Halsey LLP

(57) ABSTRACT

An inventive radio relay arrangement uses standardized protocols (e.g., DECT) for communications external to the relay portion itself, but internally, between its cascaded parts (SREP), uses a protocol which deviates from this standard with respect to the position in time of the time slots utilized for a call within the time frame. This arrangement provides unproblematic insertability, on the one hand, and, on the other hand, advantageous conditions with respect to radio channel utilization and signal delay.

4 Claims, 5 Drawing Sheets

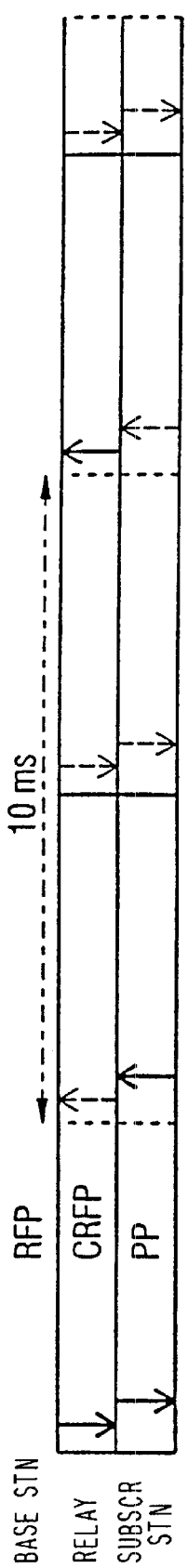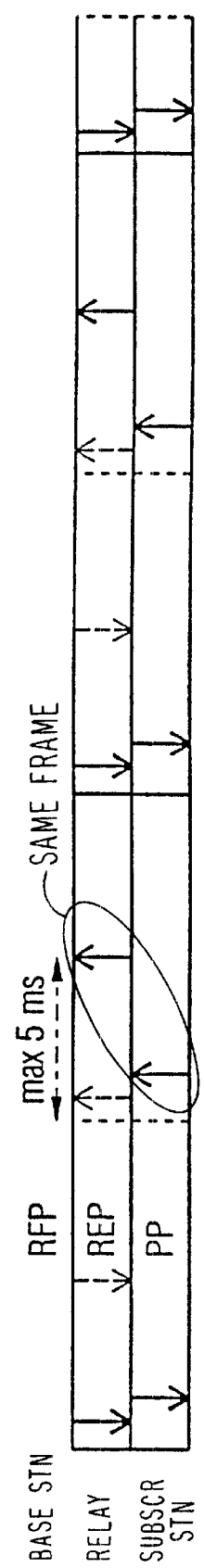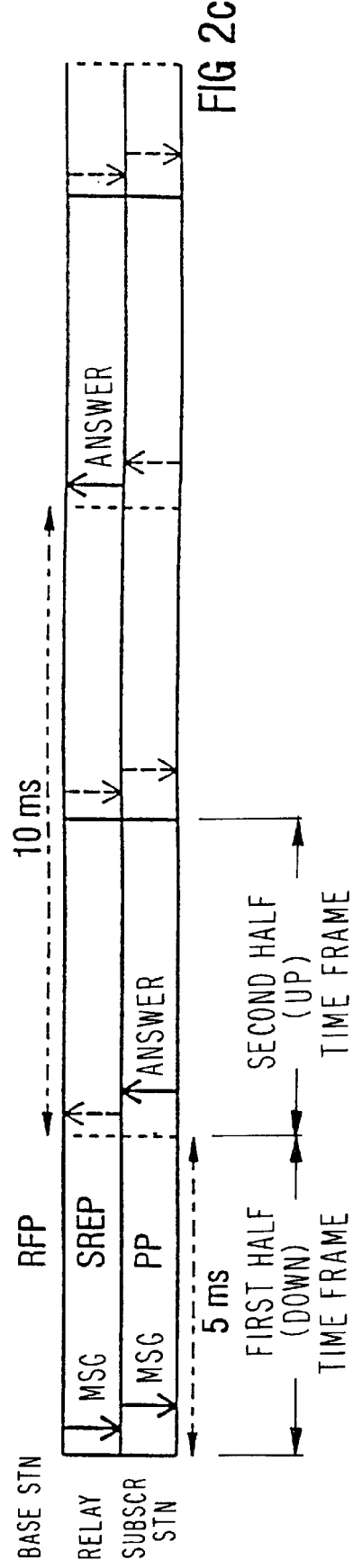

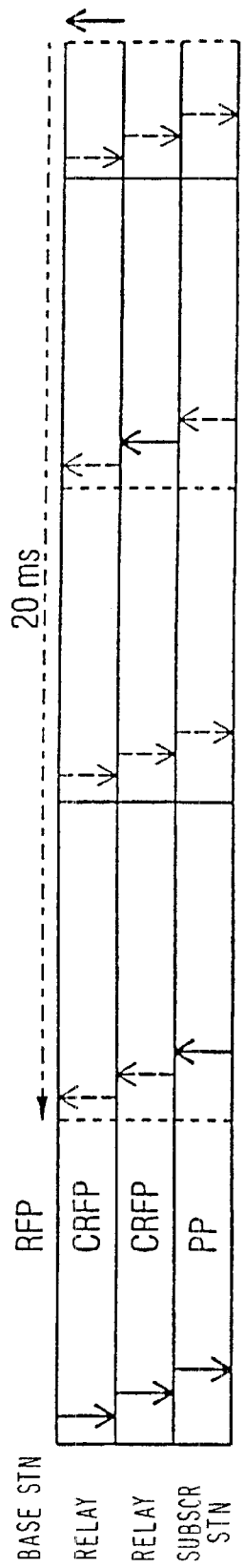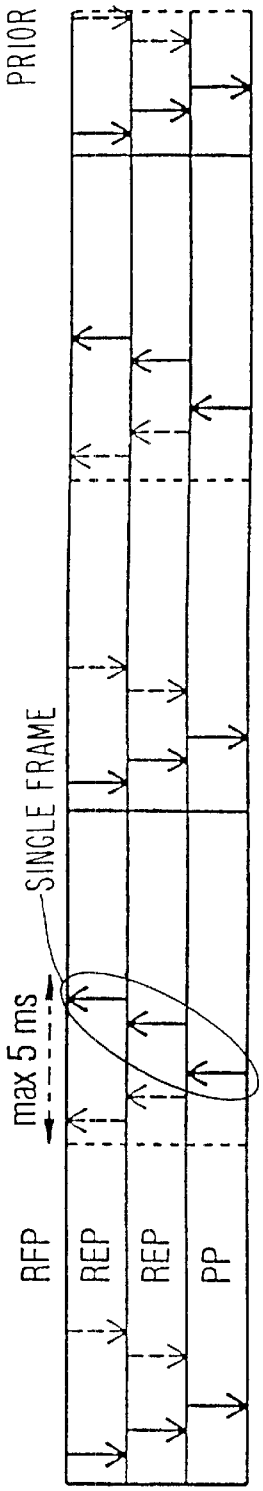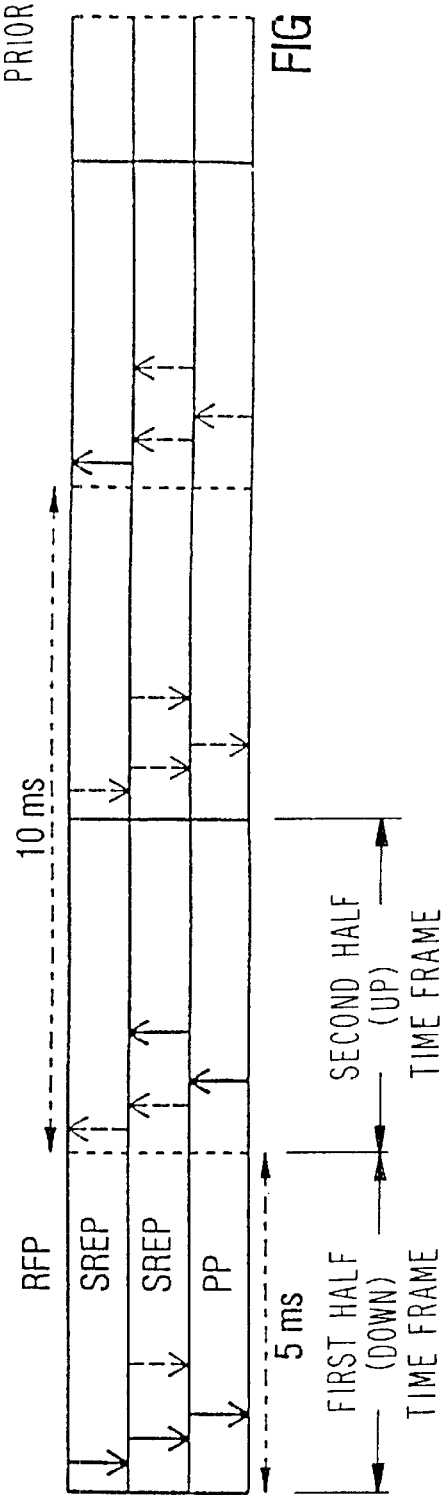

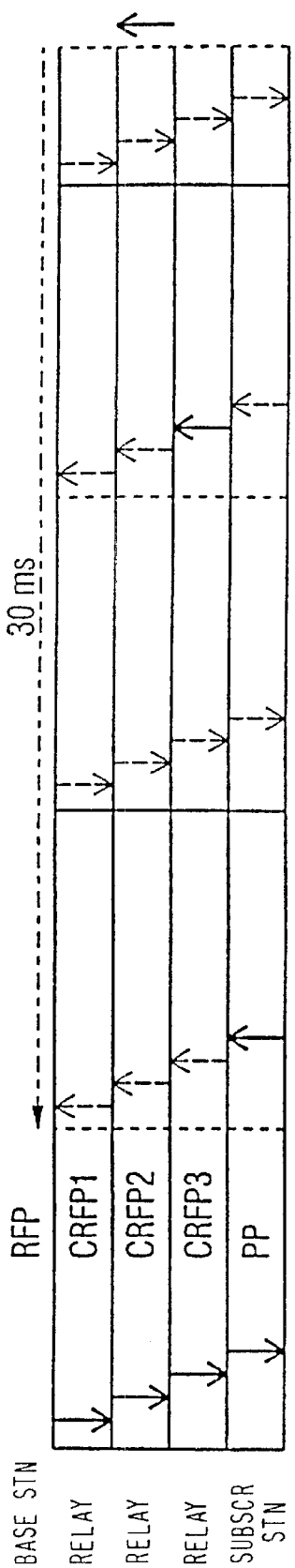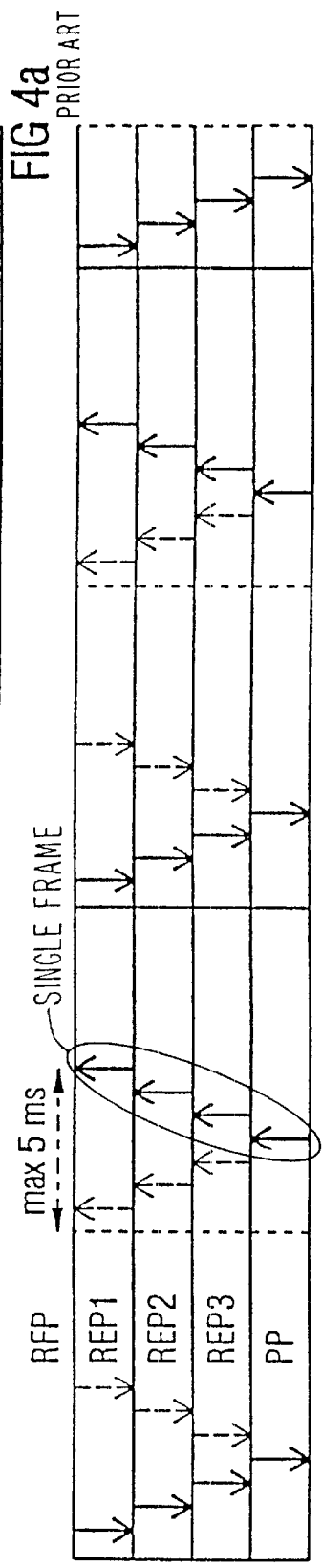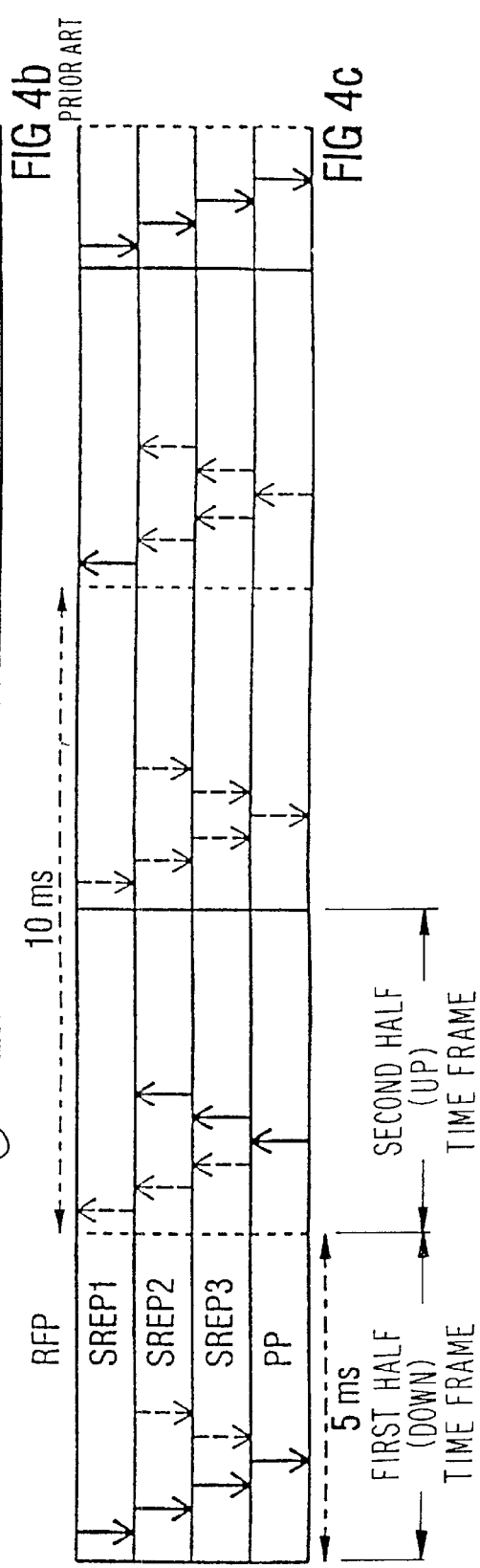

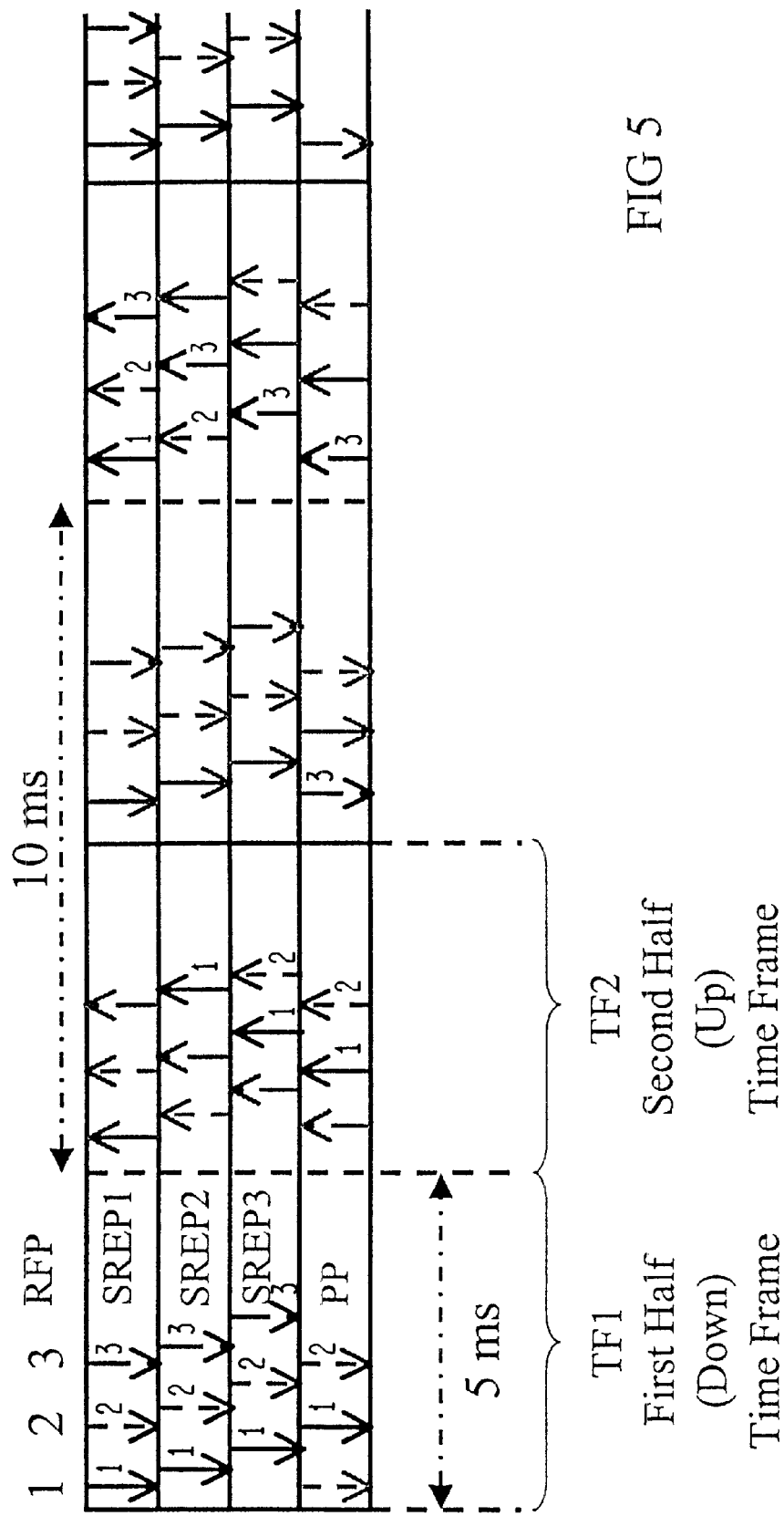

he set of time slots of the pairs not tied to the spacing by half the time-frame length is completely contained in the set of the pairs tied to the spacing by half the time-frame length.

For a number of simultaneous calls at the interfaces between the cascaded parts, in each case no more than N pairs of time slots, which are spaced apart by half the time-frame length according to standard, are used for forming the desired time-slot pairs not tied to the spacing by half the time-frame length so that all time slots occupied in the sense of the standard are actually used for transmitting information.

The standard interface conditions correspond to the DECT standard.

Accordingly, the radio relay arrangement according to the invention provides, on the other hand, externally, that is to say toward the radio communication subscriber stations and toward the radio base station, interface relationships which correspond to the standardized interface relationships on a radio link without radio relay arrangement, and, on the other hand, when the radio relay arrangement consists of a number of cascaded parts, interface relationships which keep the signal delays, which are critical in such cascading arrangements, to a sensibly small size and, nevertheless, largely prevent the risk of blocking due to a lack of suitable time slots, are provided for the interfaces between these parts, that is to say internally.

RADIO RELAY ARRANGEMENT FOR EXTENDING THE RANGE ON THE RADIO LINK OF A TELECOMMUNICATION SYSTEM

BACKGROUND OF THE INVENTION

The invention relates to a radio relay arrangement for extending the range on the radio link, connecting radio communication subscriber stations with a radio base station, of a telecommunication system.

The operation of such a radio relay arrangement requires that the totality of available radio channels is utilized as well as possible. It is a further requirement that the signal delays are not excessive even when a plurality of such radio relay arrangements are connected in cascade.

Finally, the objective must be that the use of such radio relay arrangements is possible while largely retaining the standards applicable to the radio link of the telecommunication system. Such standardization can be, for example, the DECT (Digital European Cordless Telecommunications) standard which has been defined by the European Telecommunication Standards Institute (ETSI).

ETSI also has already described two proposals for such radio relay arrangements, one of which, however, only represents a satisfactory solution with respect to the above-mentioned requirements of good utilization of the radio channels and major retention of the existing standard, and the other one of which only represents a satisfactory solution with respect to the maintenance of small signal delays, which will be discussed in still more detail in the text which follows.

SUMMARY OF THE INVENTION

It is an object of the present invention to provide an improved radio relay arrangement.

In general terms the present invention is a radio relay arrangement for extending the range on the radio link, connecting radio communication subscriber stations with a radio base station, of a telecommunication system. It provides the same interface relationships toward the radio communication subscriber stations and toward the radio base station as they are preferably given according to standard in a radio link without relays. Accordingly, in each case a pair of time slots, spaced apart from one another by half the time-frame length and having the same position in periodically repetitive time frames, is used for the radio transmissions of the up direction and down direction, belonging to the same call. In this arrangement in each case radio transmissions of the same one or other direction of transmission take place in the two halves of the time frames. If it consists of a plurality of cascaded parts, it provides between these parts interface relationships according to which a pair of time slots which are not tied to the spacing by half the time-frame length, are arranged advantageously with respect to the minimization of the total transmission time but in any case belong to the time-frame half allocated to the relevant direction of transmissions.

Advantageous developments of the present invention are as follows.

For a subdivision into a number of cascaded parts, in each case at least two pairs of time slots, spaced apart by half the time-frame length according to standard, of the up direction of transmission and of the down direction of transmission is used, between in each case two cascaded parts, for forming the pairs not tied to the spacing by half the time-frame

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2 to 5 show timing diagrams for illustrating the time-slot occupancy in the radio relay arrangements according to the invention and in the known radio relay arrangements mentioned.

DESCRIPTION OF THE PREFERRED EMBODIMENTS

Figure 1:
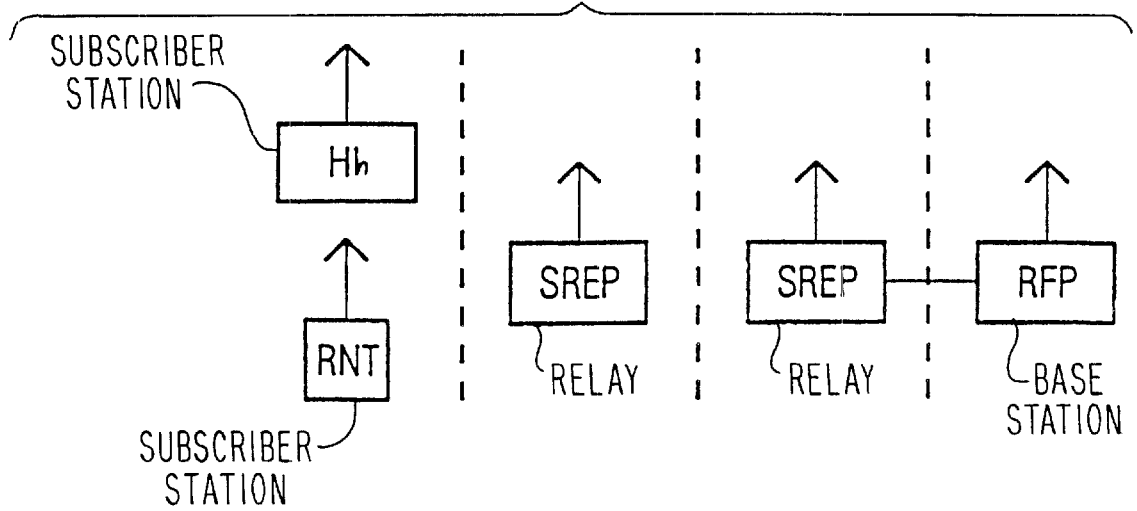
FIG. 1 shows the block diagram of the part of a telecommunication system comprising a radio link.

In the radio system according to FIG. 1, a radio link exists between subscriber stations which can be fixed subscriber stations RNT or mobile terminals Hh, and a radio base station RFP at the exchange end.

To extend the range of this radio link, two cascaded parts SREP of a radio relay arrangement are in each case arranged.

The interfaces between the individual ones of the arrangements are indicated by dashed vertical lines.

The radio relay arrangement according to the invention then operates in such a manner that between the radio base station RFP and one part SREP of the radio relay arrangement and between the other part SREP of the radio relay arrangement and the radio communication subscriber stations RNT or, respectively Hy, generally called PP in the text which follows, standard interfaces are set up which correspond to the conditions which are also given if the radio link is operated without a relay arrangement. In concrete terms, this means that a pair of time slots, spaced apart from one another by half the time-frame length and having the same position in periodically repetitive time frames, is used for radio transmissions of the up direction and of the down direction, belonging to the same call, in which arrangement in each case only radio transmissions of the same direction of transmission take place in the two halves of the time frames.

This is illustrated in FIG. 2c which shows the relationships when using an undivided radio relay arrangement of the type according to the invention.

The bold arrows in FIG. 2c show how a message can reach the radio communication subscriber stations PP as quickly as possible from the radio base station RFP via the radio relay arrangement SREP and how the answer can get from there back to the radio base station as quickly as possible under the prerequisites provided by the radio relay arrangement SREP.

The time for this forward and return travel via the radio relay arrangement is 15 ms whereas only 5 ms would be needed for this in the case of a direct radio link between radio base station RFP and radio communication subscriber stations.

The total delay is therefore 10 ms, compared with the relationships without radio relay arrangement as drawn in FIG. 2c).

The dashed arrows in FIG. 2c) are time slots which are also utilized, but for transmissions which begin in an earlier or later time frame.

In FIG. 2c), the same relationships therefore exist as in a first one of the known radio relay arrangements, called CRFP in the text which follows, and the interface relationships of which are shown in FIG. 2a).

FIG. 2b) shows the interface relationships existing in accordance with the proposal for a second known radio relay arrangement. In this radio relay arrangement, here called REP, only the REP/PP interface provides standard conditions in that pairs of time slots in each case spaced apart by a half time frame, that is to say 5 ms, are used for the up and down transmission. However, at the RFP/REP interface, two in each case periodically repetitive pairs of time slots are used for each connection, in the case of which pairs, however, the spacing of time slots is not necessarily half a time frame interval for the transmission in the up direction and down direction and, instead, the spacing is designed with respect to minimum total delay. In the worst case, the total delay, here called v and produced in comparison with the relationships without radio relay arrangement, is 5 ms.

The dashed arrows in FIG. 2b) are time slots which, although they are occupied by the REP arrangement, are not used, in contrast to the relationships shown in FIGS. 2a) and 2c), where there are no unused time slots.

FIGS. 3a, 3b and 3c shows the interface relationships for the radio relay arrangement according to the invention and the two known radio relay arrangements mentioned, for the case where these are subdivided into two cascaded parts.

As shown in FIG. 3c) which relates to the relationships in the radio relay arrangement according to the invention, a deviation from the standard relationships exists at the interface between the two parts SREP of the radio relay arrangements, in distinction from the interfaces RFP/SREP and SREP/PP, in that, similarly to the relationships according to FIG. 2b), a second pair of time slots is occupied but, at least with respect to the spacing of time slots of the up and down direction of transmission of different pairs, there is no fixed arrangement of a half time-frame length. Instead, attention is paid to the shortest possible total delay in selecting the time slots. FIG. 3c) also shows that this delay time is no more than 10 ms even with two cascaded parts SREP of the radio relay arrangement.

In the known radio relay arrangement CRFP, in contrast, the additional total signal delay caused by the radio relay arrangement is 20 ms as shown in FIG. 3a).

Although the total signal delay of 5 ms maximum remains in the known radio relay arrangement REP, see FIG. 3b), the risk of blocking, that is to say the probability of no longer finding suitable time slots if a plurality of calls has to be processed simultaneously, is much greater than in the case of the radio relay arrangement according to the invention since the respective forward and backward transmission must take place within a single time frame, that is to say in less than 10 ms, whereas a total of 15 ms is available in the arrangement according to the invention.

This is shown correspondingly in FIGS. 4a, 4b and 4c which the relationships in the case of three cascaded radio relay parts are shown.

Here, too, the total signal delay for the radio relay arrangement according to the invention remains at 10 ms, see FIG. 4c), whereas in the case of the known arrangement CRFP, the total signal delay rises to 30 ms, see FIG. 4a.

According to a further embodiment of the invention, if the radio relay arrangement is subdivided into a number of parts and with the prerequisite of synchronism of the time frames, which always applies, the available time slots at the various interfaces are used in such a manner that, firstly, a number of bidirectional calls can be conducted simultaneously via the radio relay arrangement, that, secondly, the aim is achieved for all calls that the radio relay arrangement only extends the transmission time for the up direction and down direction by a single time frame (10 ms) and that, thirdly, all occupied time slots are also used so that no time slot is wasted.

This is shown in FIG. 5 for the case of a cascade arrangement of three parts of the radio relay arrangement and the existence of three simultaneous calls. In this arrangement, the time slots used for the first call are marked by continuous arrows, the time slots of call number 2 are marked by dashed arrows and the time slots for call number 3 are marked by dot-dashed arrows. Here, too, as in most of the preceding figures, it holds true that the arrows drawn thinly mark time slots for forward and backward transmissions which begin in earlier or later time frames compared with time frames in which the transmissions begin for which time slots marked by bold arrows are used.

FIG. 5 shows how the usual time-slot pairs are used for the various calls within the radio relay arrangement for minimizing the total delay. At the RFP/SREP1 interface, three downward-pointing arrows can be seen in the first half TF1 of the time frame, which are allocated to calls 1, 2 and 3 in this order. In the second frame half TF2, the corresponding upward-pointing arrows can be seen which are allocated, according to the standard, to the same calls 1, 2 and 3 in this order.

At the SREP1/SREP2 interface, three pairs of upward- and downward-pointing arrows can also be seen in the correct duplex spacing of 5 ms. In time-frame half TF1, the correlation with calls 1, 2 and 3 is also still the same as before. In the second time-frame half TF2, however, this order is transposed into the order 2, 3, 1. This transposition results in the reduction of the total delay. At the SREP2/SREP3 interface, too, a transposition takes place within TF2, namely in the form of 3, 1, 2. At the SREP3/PP interface, however, the order within the time-frame halves is again the same, namely 1, 2, 3, according to standard.

In the text which follows, the characteristics of the radio relay arrangement according to the invention are again compared with those of the known radio relay arrangements by means of a table.

|  | CRFP | REP | SREP |
|---|---|---|---|
| No. of time-slot pairs; n calls 1 relay | For n = 1,2,3, 4; 2,4,6,8 pairs | For n = 1,2,3, 4; 3,4,7,8 pairs | For 1,2,3, 4; 2,4,6,8 pairs |
| No. of time-slot pairs; n calls 2 relays | For n = 1,2,3, 4; 3,6,9,12 pairs | For n = 1,2,3, 4; 5,6,11,12 pairs | For n = 1,2, 3,4; 4,6, 10,12 pairs |
| Total delay 1 relay | 10 ms | <5 ms | 10 ms |
| Total delay 2 relays | 20 ms | <5 ms | 10 ms |
| Total delay 3 relays | 30 ms | <5 ms | 10 ms |
| Available time-slot pairs after 5 relays | 5 | 1 | 5 |

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A radio relay arrangement for extending a range on a radio link, connecting radio communication subscriber stations with a radio base station, of a telecommunication system, comprising:

a plurality of cascaded parts, each of which are connected to one another via an internal protocol over an internal interface relationship;

wherein one of the plurality of cascaded parts is configured to communicate with the base station via an external protocol over an external interface relationship, and an other of the plurality of cascaded parts is configured to communicate with the subscriber stations via the external protocol over the external interface relationship, the external protocol being one that is based on a communication standard and configured to be able to communicate between the subscriber stations and the base station in the absence of cascaded parts;

both the internal protocol and the external protocol being configured to utilize repetitive time frames, each of the time frames comprising:

a first-half time frame that comprises multiple time slots that are used for downward direction communications; and a second-half time frame that comprises multiple time slots that are used for upward direction communications;

wherein the external protocol further comprises:

half time frame pairs of time slots, each pair being spaced apart from one another by half of a time-frame length and having a common position in periodically repetitive time frames and belonging to a same call;

wherein the internal protocol further comprises:

a non half time pair of time slots belonging to the same call which are not associated with a spacing by half the time-frame length that are arranged to minimize total transmission time but each of which belong to a time-frame half allocated to a relevant direction of transmission.

2. The radio relay arrangement as claimed in claim 1, wherein, for a subdivision into a number of cascaded parts for each cascaded part at least two pairs of time slots, spaced apart by half the time-frame length according to standard, are used of the up direction of transmission and of the down direction of transmission, between two cascaded parts, for forming pairs not tied to the spacing by half the time-frame length, such that a set of time slots of the pairs not tied to the spacing by half the time-frame length is completely contained in a set of the pairs tied to the spacing by half the time-frame length.

3. The radio relay arrangement as claimed in claim 2, wherein, for a number of simultaneous calls at the interfaces between the cascaded parts for each cascaded part no more than a predetermined number of pairs of time slots, which are spaced apart by half a standard time-frame length, are used for forming the time-slot pairs not tied to the spacing by half the time-frame length so that all time slots occupied are actually used for transmitting information.

4. The radio relay arrangement as claimed in claim 1, wherein each of the external interface relationships corresponds to the DECT standard.

* * * * *